United States Patent
Young (10) Patent No.: US 8,390,513 B2
(45) Date of Patent: Mar. 5, 2013

(54) GNSS RECEIVER AND SIGNAL TRACKING CIRCUIT AND SYSTEM

(75) Inventor: Philip John Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 12/738,234

(22) PCT Filed: Nov. 14, 2008

(86) PCT No.: PCT/EP2008/065578
§ 371 (c)(1),
(2), (4) Date: Apr. 15, 2010

(87) PCT Pub. No.: WO2009/063062
PCT Pub. Date: May 22, 2009

(65) Prior Publication Data
US 2010/0210206 A1    Aug. 19, 2010

(30) Foreign Application Priority Data
Nov. 15, 2007 (EP) .................................. 07120808

(51) Int. Cl.
*G01S 19/37* (2010.01)
(52) U.S. Cl. ................................. 342/357.77

(58) Field of Classification Search .............. 342/357.77
See application file for complete search history.

(56) References Cited

U.S. PATENT DOCUMENTS

| | | | |
|---|---|---|---|
| 5,600,670 A | 2/1997 | Turney | |
| 5,799,114 A * | 8/1998 | Dowling | 382/291 |
| 6,909,736 B2 * | 6/2005 | Akopian et al. | 375/130 |
| 7,916,075 B2 * | 3/2011 | Chen | 342/357.63 |
| 2004/0202235 A1 | 10/2004 | Kohli et al. | |
| 2006/0133463 A1 | 6/2006 | Pietila et al. | |

FOREIGN PATENT DOCUMENTS

| | | |
|---|---|---|
| EP | 0501829 A1 | 9/1992 |
| EP | 0924532 A2 | 6/1999 |
| JP | 2002500751 A | 1/2002 |
| WO | WO9740398 A2 | 10/1997 |

OTHER PUBLICATIONS

International Search Report and Written Opinion—PCT/EP2008/065578—ISA/EPO—Jun. 2, 2009.

* cited by examiner

*Primary Examiner* — Harry Liu
(74) *Attorney, Agent, or Firm* — Shyam K. Parekh; Howard H. Seo (57) ABSTRACT

A GNSS platform architecture with advanced tracking and search engines. The tracking and search functions are separated into 2 independent engines each highly optimized for their targeted functions.

72 Claims, 2 Drawing Sheets

GNSS RECEIVER AND SIGNAL TRACKING CIRCUIT AND SYSTEM

FIELD OF THE INVENTION

The present invention concerns a satellite radiolocalization receiver and in particular, but not exclusively, a radiolocalization receiver adapted to receive and process radiolocalization signals generated by a constellation of geo-localization satellite, like for example the satellites of the GPS, GLONASS or Galileo System or other global navigation satellite systems (GNSS). The present invention also concerns a signal processor unit adapted for treating demodulated radiolocalization signals provided by a suitable RF interface, and which can be embedded in a dedicated GNSS apparatus or in another host system, like for example a general-purpose computer, PDA or cell phone.

DESCRIPTION OF RELATED ART

The Global Navigation Satellite Systems (GNSS) generically include the General Positioning System (GPS), operated by the United States, the Global Orbiting Navigation Satellite System (GLONASS) operated by the Russian Federation and the projected Galileo positioning system, to be built by the European Union.

The following description and examples will often refer, for the sake of simplicity, to a GPS receiver only. It will be understood, however, that he present invention is not necessarily restricted to such a receiver, but includes also all GNSS sources, and can be extended to other future radiolocalization systems to which the invention is applicable.

GNSS radio signals are located in the UHF portion of the radio spectrum, most often above 1 GHz, have power level, at ground, of the order of −120 dBm or less and are generally direct-sequence spread-spectrum signals modulated by pseudo-random code binary sequences, which are used in the receiver for positioning and navigation. The signal structure of GPS signals is described, for example, in international patent application WO05003807, in the name of the applicant, which is hereby incorporated by reference.

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card, or a software code, containing executable code and/or circuit description instructions to implement a GNSS receiver function in an ASIC or in a set of integrated circuits.

The terms "receiver" and "GPS receiver" should also be understood, in the context of the present invention, as including one of more integrated circuits, arranged to realize a complete GPS receiver or a complete GPS module, as defined above.

BRIEF SUMMARY OF THE INVENTION

According to the invention, these aims are achieved by means of the object of the appended claims. In particular, these aims are provided by a GNSS processor comprising a tracking module including, a plurality of correlation blocks for producing a number of correlation values for a number of signals consisting of one or more channels, each correlation block containing a means for removing carrier and multiplying the resulting signal by a code corresponding to an expected feature of the signal such as a Gold code, where each correlation block is enabled to produce one or more taps within a contiguous code phase range, where one or more of the taps may be disabled from the computation to conserve power.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The present invention relates, among other to a means for producing a number of correlation values for a number of signals consisting of one or more channels each containing a means for removing carrier and multiplying the resulting signal by a code corresponding to an expected feature of the signal such as a gold code, where each correlation block is enabled to produce one or more taps covering a contiguous code phase range, where one or more of the taps may be disabled from the computation to conserver power.

According to this aspect of the invention, we can operate a channel with selective tap enabling. After a signal interruption or for initial pull-in the code phase uncertainty requires additional taps to be visible, but when the channel is being tracked the additional signal are of no interest and may be ignored. We save power by disabling the taps we don't need. We can also enable a number of additional taps for multipath mitigation, allowing us for example to reduce the tap spacing and look at the shape of the peak with a high resolution, if the shape is not symmetrical we can for example weight the pseudo range accuracy or provide an estimate of where the first peak might be and thus reduce the effect of multipath Variable Tap Spacing The present invention relates, among other things to a means for adapting the precision or code phase range of the block by adjusting the code phase relationship between adjacent taps.

Explanation

In Galileo mode we need to operate taps at a finer resolution in order to decode the MBOC signal, we can also use this feature as described above in order to aid multipath detection. Additionally this allows us to increase the tap spacing to use the channel to accelerate search mode.

Channel Chaining Mode

The present invention relates, among other to a means for extending the code phase range covered for a gold code by chaining 2 or more channels such that the carrier wipeoff and code generation is performed by a master channel, and then passed through additional slave channels, where the code and carrier generation in the slave channels may be disabled to conserve power Explanation This allows for example a 64 channel correlator to be implemented as a single correlator from the SW viewpoint using 4 actual channels, this would provide a 32 tap window which enables re-acquisition without activating the search engine.

Selective DFT Line Enabling

The present invention furthermore relates to a means for extending the frequency range of the correlator by performing DSP calculations on the correlator outputs, such as a discrete Fourier transform (DFT) computation, where the DFT lines cover a frequency range centered around the frequency of the code/carrier numerical controlled oscillator (NCO). Preferably one or more of the potential frequency lines may be disabled to conserve power and/or mask interference caused, for example, by cross correlation with a different signal containing a different gold code.

Explanation

One aspect of the present invention concerns a GNSS processor with selective tap/line masks, these allow us to use the channel for search and to increase the window on the signal during pull-in, then decrease it again to conserve power when the tracking loops are locked Staggered Integration Windows The present invention furthermore relates to a means for computing a number of correlations against a plurality of signal codes, such as gold codes, where the computation windows for each tap are overlapped, where the windows are offset by a deterministic interval, such that the correlation outputs from each tap are separated in time allowing further pipelined processing using a shared resource.

Explanation

By using constant length integration windows and staggering them in time each correlator output is offset by a number of cycles so that correlation resources can be shared in a 2 stage correlator architecture, by staggering the output across all channels we are then able to implement a single DFT engine for all channels using very few resources and allowing all correlators to share a single output memory for the results which reduces power and silicon area.

Multiple Output Formats for Search/Tracking Mode

The present invention furthermore relates to a means for processing the correlation results where the processing may include both coherent and incoherent processing, for example coherent DFT followed by incoherent accumulation of magnitude, and to a means to select for one or more channels whether the output data structure for the channels contains the complex results from coherent correlation, or the results of the incoherent accumulation.

Explanation

For search mode we look at the magnitude integrated over a long time, however for accurate tracking we ideally use the I/Q components of the coherent integration which provides a better resolution for the tracking engine, coupled with carrier phase measurements.

The measurements used will be determined by the signal strength which thus determines the position accuracy.

Implicit Noise Floor Measurements

The present invention furthermore relates to a means for processing a plurality of taps/DFT lines for a channel where the Taps/DFT lines in the output are selectable according to the region of interest to the application, where an additional set of DFT Lines/Taps are implicitly computed to provide a means for noise floor estimation Explanation In order to optimize the performance of the search/tracking algorithms it is necessary to make a noise floor measurement which will change over time, this should ideally be made in the vicinity of the signal being tracked, but sufficiently far from the peak, Preferably, the GNSS processor of the invention is arranged to measure a plurality of taps, for example 4 taps at the extremities of the DFT window. Since we use a bitmask to control the DFT this would imply all enabled line/tap combinations are computed, but by using an implicit mask the taps we are not interested in are thus masked.

Data Wipeoff by Multiplying Code and Navigation Message Prior to Shifting

The present invention furthermore relates to a means for removing a selected feature from the signal being tracked, such as a navigation data message or an additional spreading code, such as used on the pilot channel in Galileo, by modifying the code before application to the correlator. Where the data pattern is applied to the code with a fixed phase relationship such that it remains coherent to the signal data boundaries regardless of the correlation windows phase or length.

Explanation

Since we are integrating over a window which is not aligned to the code, and which is not the same length as the code, applying data wipeoff post correlation results in the data being misaligned. By applying data wipeoff to the code at the output of the code generator the data wipeoff is perfectly aligned at all times.

Galileo Mode Re-Using One Tap with a Second Code Generator

In addition the present invention concerns a means for applying an alternative spreading code to a selected tap of a such a correlator, where the phase relationship of the code applied is fixed or adjustable to ensure that it is in phase with a particular tap of the first spreading code at a particular correlator output tap to facilitate the extraction of a data message contained on a second signal which is transmitted using the second spreading code at the same carrier frequency as the first signal whilst the first signal is being used to control the tracking loop.

Explanation

Galileo uses 2 codes which are transmitted at the same carrier frequency, one is modulated with a known 25 bit spreading code and is used for tracking the SV, this allows greater sensitivity without knowledge of the navigation data message. The second is used to transfer the navigation data. Since we are tracking the pilot code we need a single tap to extract the navigation data message, the carrier and code phases of the 2 signals are coherent so we need to maintain the correct code phase and use 1 tap to extract this data. Since we select a tap in the middle of the correlator channels window as the centre point for tracking we need to phase shift the second code so that it is aligned with the tap of interest.

Varying the Sample Rate to Control DFT Line Spacing

In addition the present invention concerns a means for controlling the correlation window size, and/or the number of coherent accumulations applied for each DFT co-efficient in order to control the DFT line spacing of the resulting output Explanation The DFT line operation requires multiplication of the complex signal by a rotating complex vector. Since we compute in hardware in real time we have to use a table of approximations and select the co-efficient according to the sample.

For longer samples we reduce the correlator precision by performing multiple calculations with the same co-efficient.

The DFT line spacing is thus determined by the co-efficient step rate and the sample duration, thus we can control the sample spacing to control the DFT line spacing.

We also select the step rate through a table combining coefficients for 24 and 32 point DFT to allow us to perform 8, 16, 24, and 32 point DFT's Controlling the Coherent Alignment In addition the present invention concerns a means for selecting the coherent integration alignment by selectively ignoring certain correlator outputs whilst still updating the DFT co-efficient index, such that the coherent accumulation can maintain alignment with a feature of the signal, such as the bit boundaries of the navigation data message, whilst the DFT processing maintains the necessary carrier phase alignment.

Explanation

Since our integration windows are stepped and not an exact multiple of the code length we cannot guarantee that all samples are coherently accumulated in phase with the code, this would cause significant signal loss over time when data wipeoff is not used since the signal would potentially invert in the middle of a coherent integration destroying the result.

To prevent this we track the alignment of the coherent integration period to the navigation data bit boundary and correct it to maintain it within a window by skipping samples as necessary.

If we merely skipped the samples the DFT co-efficient would become out of phase and this would spread the power between multiple DFT lines, hence when we skip a signal from the coherent accumulation we must adjust the DFT co-efficient index, this results in the DFT co-efficient index becoming out of synch with the coherent integration since it must remain coherent with the signal even when samples are skipped.

Multi-Stage Carrier Wipeoff and Measurements

Another aspect of the present invention is related to a multi-stage carrier wipeoff mechanism whereby incoming IF/IQ data is mixed with a reference carrier to remove most of the carrier but where the carrier used is configured to leave a residual carrier of for instance 10 Khz. Further removal of the residual carrier is performed by a second carrier NCO in each channel.

Preferably it is foreseen to adjust of the master carrier NCO to compensate for systematic carrier drift due to variations in the reference clock frequency, and to sample of all carrier and code NCO values simultaneously across all channels using a trigger such as a pulse from a 1 ms reference timer.

Explanation

By removing most of the carrier in a first stage mixer we can compensate for the reference clock frequency drift and frequency plan allowing all of the channels to use a carrier NCO dimensioned for a small frequency range regardless of the frequency plan in use.

As the frequency of the NCO decreases the number of bits required to implement it increase, so a suitable frequency is selected such that the second carrier NCO can be efficiently implemented allowing for carrier phase measurements with sufficient precision to enhance the tracking and position accuracy without massive hardware.

By sampling all of the NCO's at a fixed point in time measurements are made of the code/carrier phase simultaneously for all channels allowing accurate position determination for all channels. The code epoch is also sampled to allow resolution of the code count and allow resolution of the Z count.

DFT Calculation Order

Another aspect of the present invention is related to a DFT calculation performed by calculating the centre frequency line and then stepping in one direction for a number of lines, then after a number of lines have been computed stepping in the opposite direction offset from the center line allowing a subset of the DFT lines to be calculated using simple co-efficient calculation.

In a preferred embodiment the step for the coefficients is determined by the DFT table size, DFT line spacing, and coherent sample index.

Explanation

The DFT co-efficient calculation requires indexing into a table, each successive co-efficient having a fixed rotational offset from the previous co-efficient determined by the DFT line spacing.

Since the losses in a DFT increase with the distance from the center frequency we don't calculate all DFT lines, for example we might calculate 9 lines from a 32 point co-efficient table, e.g. lines 0, 1, 2, 3, 4, 28, 29, 30, 31.

For the first sample this would require coefficients 0, 1, 2, 3, 4, 28, 29, 30, 31 whereas the second sample would require coefficients 0, 2, 4, 6, 8, 24, 26, 28, 30.

This requires the use of a modulo calculation, however by calculating the lines in the order 0, 1, 2, 3, 4, 31, 30, 29, 28 we can simplify the calculation to use a simple adder since the order becomes 0, 1, 2, 3, 4, 31, 30, 29, 28 for the first sample and 0, 2, 4, 6, 8, 30, 28, 26, 24 for the second sample etc.

Startup Synchronization

According to one aspect of the present invention, by determining a precise startup time synchronous to a known event, such as a reference timer operated synchronous to the RF reference clock, the precise values for code/carrier phase, code epoch count, navigation data message phase etc can be calculated by extrapolation of measurement from another channel, such as a channel in the search engine, or another tracking channel.

By programming these values into the configuration of a channel in advance of this time, such that the channel has time to initialize the relevant hardware to the required state, and then programming the exact start time, the channel can pre-initialize engines such as the code generator etc and then freezing them until the instant that it is configured to start.

In this way channels can be precisely positioned in tracking or search mode allowing tracking to be moved between channels and facilitating resource management.

This also allows to step a channel by resetting the channel with no penalty.

Explanation

We need to be able to initialize the code generator and NCO's etc when starting a channel to allow for resource management, in particular when changing significantly the operating mode of a channel such as the number of taps computed etc where this will change the order of data in the output data structure.

By delaying the start of the channel to a precise instant and then allowing the channel to operate until it reaches the desired mode then freeze the channels state until the prescribed start time, this is achieved with complete precision with no HW or SW overhead.

Resource Management

According to one aspect of the present invention there is provided a means of sharing an output memory between multiple correlation engines where the memory is dimensioned according to the overall system requirements rather than the combined data output capability of the complete correlation engine.

Explanation

During normal tracking operation the tracking engine will only need to compute a fraction of the available taps, whereas the number of taps computed and the mode in which they are computed will change dynamically for different channels during operation.

To reduce the overall resources required, in particular the size of the output memory, the channels can be configured to share resources where the SW can allocate sufficient resource to each channel according to it's operating mode, and can re-configure these resources as required during operation without affecting tracking.

To achieve this, a method of deterministically transferring configuration between channels or restarting a channel without losing tracking is required Multiple Coherent Prompt Data Sets Another aspect of the present invention is related to a means of passing coherent correlation results to the processor for a correlator channel consisting of a set of real time correlation results for a number of TAP/DFT line combinations to facilitate tracking, where in addition to this real time data a historical data set is presented for one or more taps known as the prompt data set, where these taps are selected to be aligned with the spreading code such that they will be at the strongest correlation phase.

Explanation

In order to track the signal the software need not service each channel in real time, depending on processor loading etc, however to extract the navigation data message efficiently all samples of the prompt tap are required so that the navigation data message edge can be determined.

To achieve this we implemented an additional set of data in the correlator output data structure in coherent mode which returns multiple data outputs for the prompt data tap, without any DFT processing. These are tagged so that the software can determine which data sets are new and implemented in a circular buffer.

These are only output in coherent mode (I/Q) since when in search mode, or tracking a weak signal involving longer than 20 ms integration, the navigation data message cannot possibly be decoded.

Introduction

Objectives

The following describes a next generation GNSS platform architecture. The purpose of this document is to explain the details of the HW and SW architectures of the architecture, in relation with the present claimed invention. Applicable Documents

GLOSSARY

2G5 Reference to the current 2.5 generation of wireless equipment or products that can include GSM, GPRS, IS-95 standards 3G Reference to the next generation ($3^{rd}$ generation) wireless equipment or products that can include WCDMA (TDD/FDD), CDMA2000 standards API Application Programmers Interface
ARPU Average Revenue Per User
BoM Bill of Materials
CDMA Code Division Multiple Access
CPU Central Processing Unit
DSP Digital Signal Processor (or Processing)
EDGE Enhanced Data-rates for GSM Evolution
E911 Enhanced 911 (reference to location requirements)
FDD Frequency Division Duplex
GSM Global System for Mobile-communications
GPRS General Packet Radio Service
HR Half Rate (telephony codec)
LBS Location Based Services
MMC Multi-Media Card
PC Personal Computer
RF Radio Frequency
SD Secure Digital (flash card)
SDIO
SV Space Vehicle (Satellite)
TDD Time Division Duplex
TIFF Time To First Fix
UE User Equipment (3G term for handset)
WCDMA Wideband CDMA Platform Concept Search Mode The Platform concept is based, inter alia, on a new proprietary search algorithm The Search engine of the processor of the present invention was developed specifically to target this new search algorithm Tracking Mode The tracking engine of the present invention bears no similarity whatsoever to previous devices, whose architectures are in fact derived from search engines. In the present invention the tracking and search functions are separated into 2 independent engines each highly optimized for their targeted functions.

Hardware Principles

When performing any algorithm in hardware, whether it be search or tracking, there is a finite amount of processing required to be performed in a given amount of time. Whilst the processing may not be at a constant rate it is bounded by peak processing requirement and latency requirements.

An important concept of the claimed architecture, which differentiates it from all other architectures, is an attention to these requirements setting the theoretical minimum limits of the processing requirements and trying to ensure the most efficient utilization of hardware resources to meet them with the smallest additional overhead.

Given the fundamental differences between search and tracking it was decided to implement these functions separately so that we can achieve the absolute minimum power and optimum tracking performance whilst enabling a scalable approach which allows a trade-off between TIFF and cost without compromising tracking.

Detailed Architecture Description

RF Interface

The RF interface is common to all blocks in the processor to which it applies and provides pre-processing of the input data to convert to a suitable representation with a residual carrier sufficiently great to allow carrier phase measurements using an appropriately dimensioned NCO per channel.

Since NCO registers become larger for smaller output frequencies and larger input frequencies this is configured for a residual carrier around 10 KHz.

Data Mapping

Figure 1:
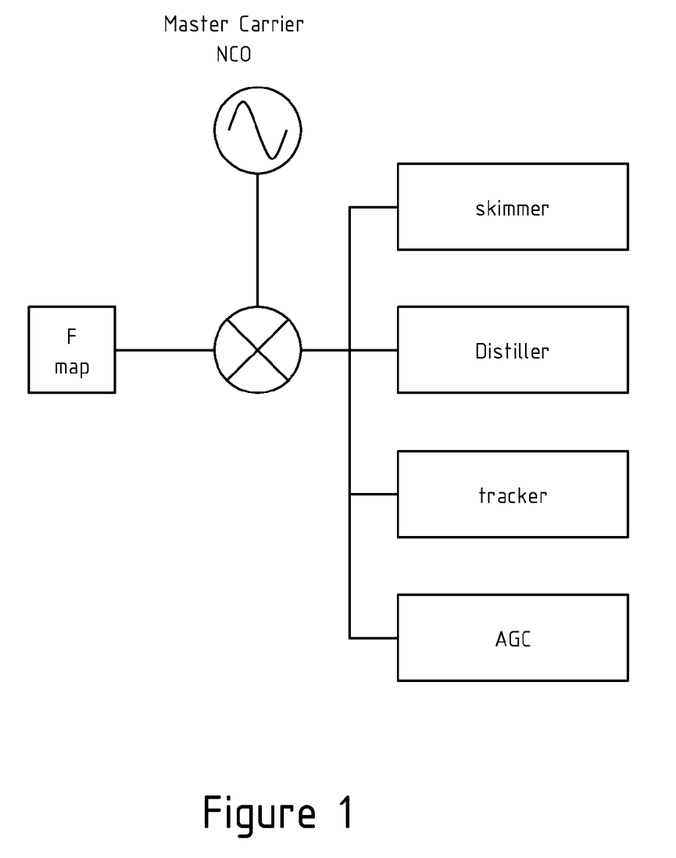
FIG. 1 shows schematically the overall architecture of a GNSS processor according to one aspect of the invention and illustrates the RF/IF carrier wipeoff and routing to the main blocks in a GPS engine corresponding to the described architecture

With reference to FIG. 1, data from the RF arrives as IF or complex I/Q data to a mapping unit where the raw data indications are translated to a suitable mapping for the entire processor. The MAP is a ram based lookup table allowing any source data representation to be mapped appropriately.

Carrier Wipeoff

After mapping the data is mixed with a carrier to remove the main carrier component, this produces a complex signal with a small residual carrier component typically around 10 Khz, this initial carrier wipeoff allows a single point of control for TCXO frequency correction enabling compensation for frequency drift when using a less stable reference such as a CDXO.

AGC

The AGC function provides statistical binning of the RF output allowing SW controlled AGC by programming the gain in the RF.

Tracking Engine

According to one aspect of the invention, the tracking engine has been based on the principles explained above allowing both code and carrier phase to be precisely controlled and measured for each channel to improve the tracking accuracy. In addition however it implements a number of additional functions.

Taps

Each tracking channel provides up to 16 taps which can be individually selected for each channel, further these taps can have programmable spacing allowing resolutions down to ⅛ chip between taps which allows careful analysis of the shape of the correlation peak to aid in identification of multi-path interference and the selection of the true peak which may be weaker than the peak actually tracked.

Taps can be individually enabled/disabled using a bitmask to conserve power, when a tap is disabled the logic for it is gated to reduce power consumption to an absolute minimum.

Chaining

In the tracking engine channels are grouped into blocks of 4 channels, within these groups consecutive channels can be chained allowing one or 2 larger channels to be created from a single group. In this mode the code generators and NCO's of the master channel are used and the slave channels units are disabled to save power.

Galileo

In each group of 4 channels there is one special channel (0) which can be configured to operate as a Galileo channel, this channel has an additional code generator assigned to tap0 which is used for data recovery, and the main code generator is then fed in at Tap1 for tracking the pilot code.

Since Galileo codes are not generateable codes additional RAM based code generators are provided in these channels for both the pilot and data codes.

Data Wipeoff

All channels support data wipeoff, in GPS mode this supports a 16 bit code segment using a register which the CPU loads periodically with 16 code samples, i.e. every 320 ms, this code can be accurately phase aligned to the detected bit edge and thereafter is controlled by the channels code NCO so that bit edge synchronization is maintained. Double buffering with handshaking is provided to remove real time constraints on the SW and allow the code to be buffered on the host and transmitted serially to the processor to reduce memory footprint. In Galileo mode the data wipeoff register is extended to 25 bits and applied to the pilot channel since the data channel is never tracked, this code operates cyclically so once initialized the CPU has no need to update it ever.

DFT

Preferably, the processor of the invention is arranged or programmed to execute DFT operations to aid in the discriminator, this is preferably implemented in hardware so that there is no CPU overhead associated with it. As with the skimmer and distiller individual DFT lines can be disabled to conserve power.

Noise Floor

To aid in detection of the noise floor the TE can be configured to output specific DFT Lines and Taps to a dedicated data structure independently of the TAP and DFT Line mask settings to reduce power.

Channel Transfer

To facilitate management of resources in the tracking engine both the carrier and code phase can be initialized to a known value and a precise time reference, this enables a channel to be reset or re-configured and commence operation with precise alignment.

Output

Output from the tracking channels is provided in registers for the measurement information and in a shared RAM buffer for all tap outputs. Each channel can be configured completely independently of all other channels and can operate in either magnitude or complex mode. In magnitude mode incoherent integration is facilitated for periods of several seconds and magnitude data is output, this is used for the search confirmation phase. In tracking mode the output data can be configured to be complex I/Q values for each selected Tap/Line combination to allow more accurate tracking.

Implementation

To conserve power and silicon area the tracking engines operate in a stepped correlation mode, this means that although each tap integrates for exactly the same duration the actual data samples for each tap are offset by a fixed number of cycles. This allows for a multi-stage correlator approach whereby the lower bits of each correlator all have dedicated accumulators and registers, however the upper bits share a single accumulator and are calculated sequentially allowing the results to be accumulated into a memory which is much more silicon and power efficient.

To facilitate this approach the representation throughout the correlator utilizes the Biased arithmetic mode.

By biasing all values to be positive prior to accumulation the data will only ever increase allowing the upper stage of the correlator to be implemented in half adders. Additionally, since this reduces the actual toggling of data values in the memory storage elements power dissipation in the memory is further reduced.

This results in a fixed bias being accumulated across all taps in the tracking engine which is simply removed at the input stage of the DFT processor.

Figure 2:
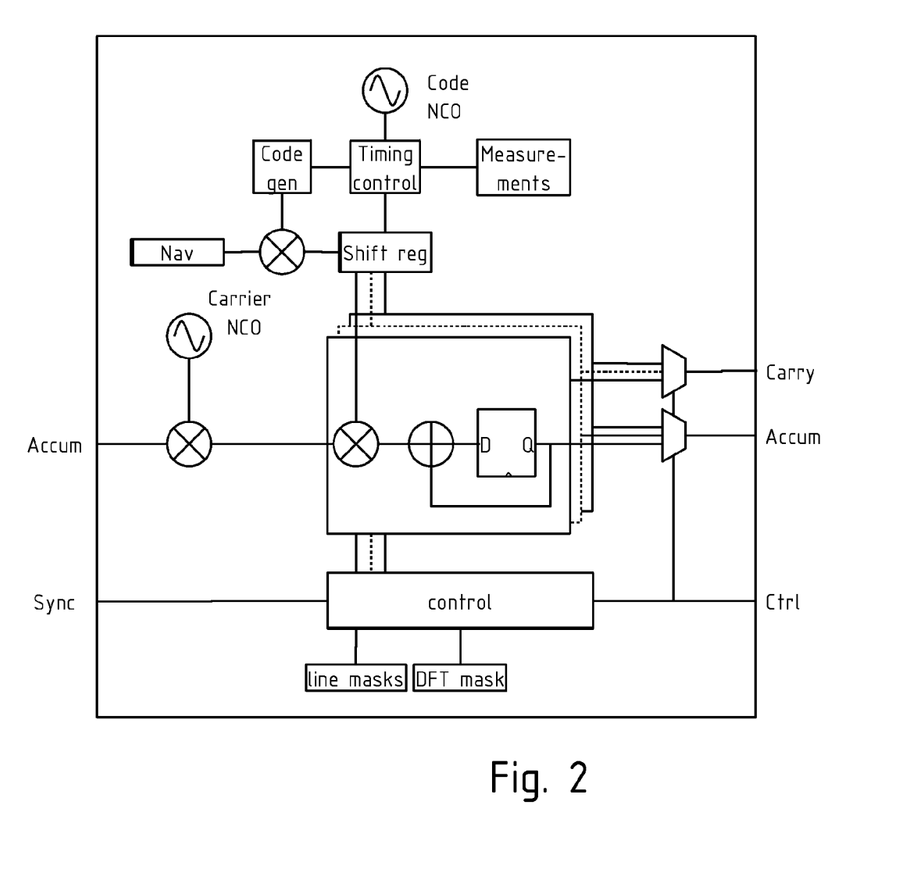
FIG. 2 illustrates the first stage of the tracking engine correlator and carrier wipeoff according to the described architecture

The second stage of the accumulation, as shown in FIG. 2, is performed using a single accumulator for each input channel, i.e. per 16 taps, this is used to increment values stored in a shared memory representing the upper bits of the biased accumulated value, since the value is biased and therefore always positive there is no requirement to allocate storage for the lower bits since these can be accumulated across longer periods in the first stage and then simply appended to the bits from stage 2 as each channels results are passed to the DFT engine.

Figure 3:
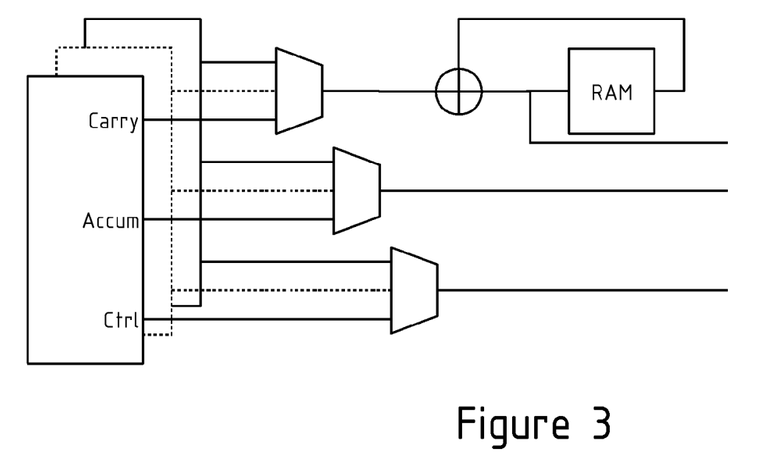
FIG. 3 illustrates the second stage of correlation according to the described architecture

With reference to FIG. 3, the number of channels sharing a single RAM and Accumulator is determined based on the granularity required for the coherent integration step, as the number of taps sharing an output stage increases the update rate per channel decreases and therefore the size of the stage 1 accumulators and registers increases, this is scaleable on an instantiation basis according to the GPS targets.

For example, given 256 taps (16 channels) operating at 32 Mhz sample rate, representation of +/−1, +/−3 for the RF data, the maximum correlation value for 1 mS would be +/−65472.

In a conventional architecture this requires 17 bits per tap for each of I/Q, or 34 full adder cells and 34 registers per tap,=8704 registers and full adders.

With all taps sharing a single stage 1, the maximum accumulated over 256 cycles is +/−512, requiring 10 bits, With a carry flag this requires 22 bits per tap,=5632 registers and 5632 full adder cells.

Stage 2 now accumulates the upper bits requiring 1792 RAM bits and just 20 half adder cells.

The additional multiplexing costs required to access the correlator results are also reduced since the RAM does not require multiplexing of data outputs to drive the DFT engine.

To select 1 of 256 taps requires 255*34 (8670) 2 to 1 multiplexor equivalents, whereas with the ram based approach only 5610 equivalent multiplexors are required.

In addition to the logic savings there is a massive reduction in the signal toggling rates since the numbers no longer change sign, simulations of the 2 alternative architectures show approximately 30% dynamic power saving with this approach.

By increasing the update rate, which requires splitting the stage 2 into 2 parts there is a reduction of register usage by 512 registers and corresponding reduction in full adder and MUX cells with a small penalty due to the use of 2 smaller ram blocks, in this configuration the stage 2 outputs are then multiplexed into the DFT engine.

In this manner the architecture is flexible and can be optimized to each process and library to get the optimum performance.

Timing

All channels in the tracking engine share a common DFT unit, this is facilitated by all channels outputting their accumulated results in a fixed and precisely controlled order. This timing is maintained by a top level timing controller which can be programmed to reduce the output data rate to a rate which prevents numeric overflow according to the RF Reference clock frequency. Additionally, using this timing controller the effective output rate can be set to a constant value regardless of the reference clock to ensure the precise DFT line spacing.

DFT Sample Rate

In order to control the DFT line spacing the sample rate can be controlled using the master timing controller, in addition the number of samples accumulated for each set of DFT coefficients can be set on a per channel basis allowing effective DFT sample rates between 250 us and 2 ms.

DFT Coherency

Since the actual integration period for any Tap is not precisely related to the associated SV's code rate due to Doppler and clocking issues the tracking engine channels each have a monitor which tracks the integration phase against the bit edge boundaries. The monitors automatically cause the channel to adjust the coherent/incoherent phases as required to maintain the coarse coherent integration synchronization to the navigation data message bit edges.

Clocking

To further conserve power in tracking mode the tracking engine operates entirely from the reference clock, and the processing pipeline is carefully designed to facilitate this operation. This enables the processor of the invention to operate without the PLL in a low power tracking mode.

Measurements

All measurements in the overall GNSS engine are performed using a reference timer operated continuously from the RF reference clock. This facilitates tracking through precise measurements made simultaneously on all channels, and simplifies channel control and setup.

External Synchronization

To facilitate intermittent operation where the reference clock may be disabled, or to allow synchronization with external events such as a network time sync event, an auxiliary time reference circuit is included, this has the ability to make measurements of the reference timer phase against external signals, or against an internal timer operated from an independent clock source, such as an RTC crystal oscillator. This unit can be configured to provide edge detection for both rising and falling edges of an external event, and/or to provide a secondary internal timing reference against which the reference timer can be measured and it's absolute phase calculated. Coupled with the channel control mechanisms in the GNSS engine this allows operation with an interrupted reference clock and rapid re-acquisition of signals in all system environments.

Processor Interface

The processor interface to the GNSS engine and its associated peripherals consists of a generic synchronous interface together with a wrapper for AHB/APB busses. This allows easy porting to any known CPU architecture without any changes to the GNSS core logic.

Viterbi

In order to reduce the processing required to decode the navigation data message for SBAS and Viterbi operation the processor of the invention contains, preferably, a Viterbi accelerator. This is based on a patented architecture which extends the ARC processor architecture with a Viterbi instruction set optimized to the processor core and GNSS constraints.

The invention claimed is:

1. A global navigation satellite systems (GNSS) processor comprising:

means for tracking including, a plurality of correlation blocks for producing a number of correlation values for a number of signals comprising one or more channels, each correlation block containing a means for removing a carrier and multiplying a resulting signal by a code corresponding to an expected feature of the signal, where each correlation block is enabled to produce one or more taps within a contiguous code phase range, and where one or more of the taps may be disabled from a computation to conserve power; and means for extending a frequency range of a correlator by performing digital signal processing (DSP) calculations on correlator outputs, the DSP calculations being a discrete Fourier transform (DFT) computation, where DFT lines cover a frequency range centered around a frequency of a code/carrier numerical controlled oscillator (NCO).

2. The GNSS processor of claim 1, including a means for adapting the precision or code phase range of the blocks by adjusting a code phase relationship between adjacent taps in the block.

3. The GNSS processor of claim 1, including a means for extending the code phase range covered for a code by chaining two or more channels such that carrier wipeoff and code generation is performed by a master channel, and then passed through additional slave channels, where the code and carrier generation in the slave channels may be disabled to conserve power.

4. A global navigation satellite systems (GNSS) processor comprising:

means for computing a number of correlations against a plurality of signal codes, the means for computing including a plurality of correlation taps, where computation windows for each tap are overlapped, and where the windows are offset by a deterministic interval such that correlation outputs from each tap are separated in time allowing further pipelined processing using a shared resource; and means for processing a plurality of taps/discrete Fourier transform (DFT) lines for a channel where the taps/DFT lines in an output are selectable according to a region of interest to an application, where an additional set of taps/DFT lines are implicitly computed to provide a means for noise floor estimation.

5. The GNSS processor of claim 4, including means for performing a coherent discrete Fourier transform (DFT) followed by incoherent accumulation of magnitude.

6. The GNSS processor of claim 5, comprising a means to select for one or more channels whether an output data structure for the channels contains complex results from coherent correlation, or results of the incoherent accumulation.

7. The GNSS processor of claim 4, comprising a means for removing a selected feature from a signal being tracked by modifying a code before application to a correlator, wherein a data pattern is applied to the code with a fixed phase relationship such that it remains coherent to signal data boundaries regardless of a phase or length of correlation windows.

8. The GNSS processor of claim 7, comprising a means for applying an alternative spreading code to a selected tap of a correlator, where a phase relationship of the alternative spreading code applied is fixed or adjustable to ensure that it is in phase with a first spreading code at a particular tap to facilitate extraction of a data message contained on a second signal which is transmitted using a second spreading code at a same carrier frequency as a first signal while the first signal is used to control a tracking loop.

9. The GNSS processor of claim 8, comprising a means for controlling a correlation window size, and/or a number of coherent accumulations applied for each DFT co-efficient in order to control DFT line spacing of a resulting output.

10. The GNSS processor of claim 9, comprising a means for selecting coherent integration alignment by selectively ignoring certain correlator outputs while updating a DFT co-efficient index, such that coherent accumulation maintains alignment with a feature of the signal, DFT processing maintains necessary carrier phase alignment.

11. A global navigation satellite systems (GNSS) processor comprising:
means for computing a number of correlations against a plurality of signal codes, the means for computing including a plurality of correlation taps;
means for mixing incoming IF/IQ data with a reference carrier to remove most of the carrier, the means for mixing including a multi-stage carrier wipeoff mechanism, wherein the carrier used is configured to leave a residual carrier of approximately 10 Khz;
means for further removing the residual carrier in each channel, including a second carrier numerical controlled oscillator (NCO), and allowing carrier phase measurements to be used for greater navigation accuracy; and
means for sampling all carrier and code NCO values simultaneously across all channels using a trigger, the trigger being a pulse from a 1 ms reference timer.

12. The GNSS processor of claim 11, including adjustment means to adjust a master carrier NCO to compensate for systematic carrier drift due to variations in a reference clock frequency.

13. A global navigation satellite systems (GNSS) processor comprising:
means for computing a number of correlations against a plurality of signal codes, the means for computing including a plurality of correlation taps;
means for calculating a discrete Fourier transform (DFT), wherein the DFT calculation is performed by:
calculating a first particular frequency line, stepping in one direction for a number of lines, and after a number of lines have been computed, stepping in the opposite direction offset from a second particular line allowing a subset of the DFT lines to be calculated using simple co-efficient calculation; and
means for sharing an output memory between multiple correlation engines where the memory is dimensioned according to overall system requirements rather than combined data output capability of a complete correlation engine.

14. The GNSS processor of claim 13, where the first particular frequency line calculated is DFT center line and the first particular line calculated in a second step is the line "−1".

15. The GNSS processor of claim 14, wherein a step for coefficients is determined by a DFT table size, DFT line spacing, and a coherent sample index.

16. The GNSS processor of claim 13, wherein by determining a start-up time synchronous to a known event, values for code/carrier phase, code epoch count, and navigation data message phase can be calculated by extrapolation of a measurement from another channel.

17. The GNSS processor claim 16, wherein by programming the values into a configuration of a channel in advance of the start-up time, such that the channel has time to initialize relevant hardware to a required state, and then programming an exact start time, the channel can pre-initialize an engine and then freeze the engine until an instant that it is configured to start.

18. The GNSS processor of claim 13, including means of passing coherent correlation results to the processor for a correlator channel comprising a set of real time correlation results for a number of tap/DFT line combinations to facilitate tracking, where in addition to the real time data, a historical data set is presented for one or more taps, where the one or more taps are selected to be aligned with a spreading code to be at a strongest correlation phase.

19. A method for processing global navigation satellite systems (GNSS) signals, comprising:
tracking a number of signals comprising one or more channels, the tracking including using a plurality of correlation blocks for producing a number of correlation values for the number of signals, each correlation block for removing a carrier and multiplying a resulting signal by a code corresponding to an expected feature of the signal, where each correlation block is enabled to produce one or more taps within a contiguous code phase range, and where one or more of the taps may be disabled from a computation to conserve power; and
extending a frequency range of a correlator by performing digital signal processing (DSP) calculations on correlator outputs, the DSP calculations being a discrete Fourier transform (DFT) computation, where DFT lines cover a frequency range centered around a frequency of a code/carrier numerical controlled oscillator (NCO).

20. The method for processing GNSS signals of claim 19, further comprising adapting the precision or code phase range of the blocks by adjusting a code phase relationship between adjacent taps in the block.

21. The method for processing GNSS signals of claim 19, further comprising extending the code phase range covered for a code by chaining two or more channels such that carrier wipeoff and code generation is performed by a master channel, and then passed through additional slave channels, where the code and carrier generation in the slave channels may be disabled to conserve power.

22. An apparatus for processing global navigation satellite systems (GNSS) signals, comprising:
a processing system configured to:
track a number of signals comprising one or more channels, the processing system further configured to track by using a plurality of correlation blocks for producing a number of correlation values for the number of signals, each correlation block for removing a carrier and multiplying a resulting signal by a code corresponding to an expected feature of the signal, where each correlation block is enabled to produce one or more taps within a contiguous code phase range, and where one or more of the taps may be disabled from a computation to conserve power; and extend a frequency range of a correlator by performing digital signal processing (DSP) calculations on correlator outputs, the DSP calculations being a discrete Fourier transform (DFT) computation, where DFT lines cover a frequency range centered around a frequency of a code/carrier numerical controlled oscillator (NCO).

23. The apparatus for processing GNSS signals of claim 22, wherein the processing system is further configured to adapt the precision or code phase range of the blocks by adjusting a code phase relationship between adjacent taps in the block.

24. The apparatus for processing GNSS signals of claim 22, wherein the processing system is further configured to extend the code phase range covered for a code by chaining two or more channels such that carrier wipeoff and code generation is performed by a master channel, and then passed through additional slave channels, where the code and carrier generation in the slave channels may be disabled to conserve power.

25. A computer program product, comprising:
a non-volatile computer-readable medium comprising code for:
tracking a number of signals comprising one or more channels, the tracking including using a plurality of correlation blocks for producing a number of correlation values for the number of signals, each correlation block for removing a carrier and multiplying a resulting signal by a code corresponding to an expected feature of the signal, where each correlation block is enabled to produce one or more taps within a contiguous code phase range, and where one or more of the taps may be disabled from a computation to conserve power; and
extending a frequency range of a correlator by performing digital signal processing (DSP) calculations on correlator outputs, the DSP calculations being a discrete Fourier transform (DFT) computation, where DFT lines cover a frequency range centered around a frequency of a code/carrier numerical controlled oscillator (NCO).

26. The computer program product of claim 25, wherein the non-volatile storage medium further comprises code for adapting the precision or code phase range of the blocks by adjusting a code phase relationship between adjacent taps in the block.

27. The computer program product of claim 25, wherein the non-volatile storage medium further comprises code for extending the code phase range covered for a code by chaining two or more channels such that carrier wipeoff and code generation is performed by a master channel, and then passed through additional slave channels, where the code and carrier generation in the slave channels may be disabled to conserve power.

28. A method for processing global navigation satellite systems (GNSS) signals, comprising:
computing a number of correlations against a plurality of signal codes using a plurality of correlation taps, where computation windows for each tap are overlapped, and where the windows are offset by a deterministic interval such that correlation outputs from each tap are separated in time allowing further pipelined processing using a shared resource; and
processing a plurality of taps/discrete Fourier transform (DFT) lines for a channel where the taps/DFT lines in an output are selectable according to a region of interest to an application, where an additional set of taps/DFT lines are implicitly computed for noise floor estimation.

29. The method for processing GNSS signals of claim 28, further comprising performing a coherent discrete Fourier transform (DFT) followed by incoherent accumulation of magnitude.

30. The method for processing GNSS signals of claim 29, further comprising selecting for one or more channels whether an output data structure for the channels contains complex results from coherent correlation, or results of the incoherent accumulation.

31. The method for processing GNSS signals of claim 28, further comprising removing a selected feature from a signal being tracked by modifying a code before application to a correlator, wherein a data pattern is applied to the code with a fixed phase relationship such that it remains coherent to signal data boundaries regardless of a phase or length of correlation windows.

32. The method for processing GNSS signals of claim 31, further comprising applying an alternative spreading code to a selected tap of a correlator, where a phase relationship of the alternative spreading code applied is fixed or adjustable to ensure that it is in phase with a first spreading code at a particular tap to facilitate extraction of a data message contained on a second signal which is transmitted using a second spreading code at a same carrier frequency as a first signal while the first signal is used to control a tracking loop.

33. The method for processing GNSS signals of claim 32, further comprising controlling a correlation window size, and/or a number of coherent accumulations applied for each DFT co-efficient in order to control DFT line spacing of a resulting output.

34. The method for processing GNSS signals of claim 33, further comprising selecting coherent integration alignment by selectively ignoring certain correlator outputs while updating a DFT co-efficient index, such that coherent accumulation maintains alignment with a feature of the signal, DFT processing maintains necessary carrier phase alignment.

35. An apparatus for processing global navigation satellite systems (GNSS) signals, comprising:
a processing system configured to:
compute a number of correlations against a plurality of signal codes using a plurality of correlation taps, where computation windows for each tap are overlapped, and where the windows are offset by a deterministic interval such that correlation outputs from each tap are separated in time allowing further pipelined processing using a shared resource; and
process a plurality of taps/discrete Fourier transform (DFT) lines for a channel where the taps/DFT lines in an output are selectable according to a region of interest to an application, where an additional set of taps/DFT lines are implicitly computed for noise floor estimation.

36. The apparatus of claim 35, wherein the processing system is further configured to perform a coherent discrete Fourier transform (DFT) followed by incoherent accumulation of magnitude.

37. The apparatus of claim 36, wherein the processing system is further configured to select for one or more channels whether an output data structure for the channels contains-complex results from coherent correlation, or results of the incoherent accumulation.

38. The apparatus of claim 35, wherein the processing system is further configured to remove a selected feature from a signal being tracked by modifying a code before application to a correlator, wherein a data pattern is applied to the code with a fixed phase relationship such that it remains coherent to signal data boundaries regardless of a phase or length of correlation windows.

39. The apparatus of claim 38, wherein the processing system is further configured to apply an alternative spreading code to a selected tap of a correlator, where a phase relationship of the alternative spreading code applied is fixed or adjustable to ensure that it is in phase with a first spreading code at a particular tap to facilitate extraction of a data message contained on a second signal which is transmitted using a second spreading code at a same carrier frequency as a first signal while the first signal is used to control a tracking loop.

40. The apparatus of claim 39, wherein the processing system is further configured to control a correlation window size, and/or a number of coherent accumulations applied for each DFT co-efficient in order to control DFT line spacing of a resulting output.

41. The apparatus of claim 40, wherein the processing system is further configured to select coherent integration alignment by selectively ignoring certain correlator outputs while updating a DFT co-efficient index, such that coherent accumulation maintains alignment with a feature of the signal, DFT processing maintains necessary carrier phase alignment.

42. A computer program product, comprising:
a computer-readable medium comprising code for:
computing a number of correlations against a plurality of signal codes using a plurality of correlation taps, where computation windows for each tap are overlapped, and where the windows are offset by a deterministic interval such that correlation outputs from each tap are separated in time allowing further pipelined processing using a shared resource; and
processing a plurality of taps/discrete Fourier transform (DFT) lines for a channel where the taps/DFT lines in an output are selectable according to a region of interest to an application, where an additional set of taps/DFT lines are implicitly computed for noise floor estimation.

43. The computer program product of claim 42, wherein the non-volatile storage medium further comprises code for performing a coherent discrete Fourier transform (DFT) followed by incoherent accumulation of magnitude.

44. The computer program product of claim 43, comprising wherein the non-volatile storage medium further comprises code for selecting for one or more channels whether an output data structure for the channels contains-complex results from coherent correlation, or results of the incoherent accumulation.

45. The computer program product of claim 42, wherein the non-volatile storage medium further comprises code for removing a selected feature from a signal being tracked by modifying a code before application to a correlator, wherein a data pattern is applied to the code with a fixed phase relationship such that it remains coherent to signal data boundaries regardless of a phase or length of correlation windows.

46. The computer program product of claim 45, wherein the non-volatile storage medium further comprises code for applying an alternative spreading code to a selected tap of a correlator, where a phase relationship of the alternative spreading code applied is fixed or adjustable to ensure that it is in phase with a first spreading code at a particular tap to facilitate extraction of a data message contained on a second signal which is transmitted using a second spreading code at a same carrier frequency as a first signal while the first signal is used to control a tracking loop.

47. The computer program product of claim 46, wherein the non-volatile storage medium further comprises code for controlling a correlation window size, and/or a number of coherent accumulations applied for each DFT co-efficient in order to control DFT line spacing of a resulting output.

48. The computer program product of claim 47, wherein the non-volatile storage medium further comprises code for selecting coherent integration alignment by selectively ignoring certain correlator outputs while updating a DFT co-efficient index, such that coherent accumulation maintains alignment with a feature of the signal, DFT processing maintains necessary carrier phase alignment.

49. A method for processing global navigation satellite systems (GNSS) signals, comprising:
computing a number of correlations against a plurality of signal codes using a plurality of correlation taps;
mixing incoming IF/IQ data with a reference carrier to remove most of the carrier using a multi-stage carrier wipeoff mechanism, wherein the carrier used is configured to leave a residual carrier of approximately 10 Khz;
further removing the residual carrier in each channel, using a second carrier numerical controlled oscillator (NCO), and allowing carrier phase measurements to be used for greater navigation accuracy; and
sampling all carrier and code NCO values simultaneously across all channels using a trigger, the trigger being a pulse from a 1 ms reference timer.

50. The method for processing GNSS signals of claim 49, further comprising adjusting a master carrier NCO to compensate for systematic carrier drift due to variations in a reference clock frequency.

51. An apparatus for processing global navigation satellite systems (GNSS) signals, comprising:
a processing system configured to:
compute a number of correlations against a plurality of signal codes using a plurality of correlation taps;
mix incoming IF/IQ data with a reference carrier to remove most of the carrier using a multi-stage carrier wipeoff mechanism, wherein the carrier used is configured to leave a residual carrier of approximately 10 Khz;
further remove the residual carrier in each channel, using a second carrier numerical controlled oscillator (NCO), and allowing carrier phase measurements to be used for greater navigation accuracy; and
sample all carrier and code NCO values simultaneously across all channels using a trigger, the trigger being a pulse from a 1 ms reference timer.

52. The apparatus for processing GNSS signals of claim 51, wherein the processing system is further configured to adjust a master carrier NCO to compensate for systematic carrier drift due to variations in a reference clock frequency.

53. A computer program product, comprising:
a non-volatile computer-readable medium comprising code for:
computing a number of correlations against a plurality of signal codes using a plurality of correlation taps;
mixing incoming IF/IQ data with a reference carrier to remove most of the carrier using a multi-stage carrier wipeoff mechanism, wherein the carrier used is configured to leave a residual carrier of approximately 10 Khz;
further removing the residual carrier in each channel, using a second carrier numerical controlled oscillator (NCO), and allowing carrier phase measurements to be used for greater navigation accuracy; and sampling all carrier and code NCO values simultaneously across all channels using a trigger, the trigger being a pulse from a 1 ms reference timer.

54. The computer program product of claim 53, wherein the non-volatile storage medium further comprises code for adjusting a master carrier NCO to compensate for systematic carrier drift due to variations in a reference clock frequency.

55. A method for processing global navigation satellite systems (GNSS) signals, comprising:

computing a number of correlations against a plurality of signal codes using a plurality of correlation taps;

calculating a discrete Fourier transform (DFT), wherein the DFT calculation is performed by:
calculating a first particular frequency line,
stepping in one direction for a number of lines, and
after a number of lines have been computed, stepping in the opposite direction offset from a second particular line allowing a subset of the DFT lines to be calculated using simple co-efficient calculation; and sharing an output memory between multiple correlation engines where the memory is dimensioned according to overall system requirements rather than combined data output capability of a complete correlation engine.

56. The method for processing GNSS signals of claim 55, wherein the first particular frequency line calculated is DFT center line and the first particular line calculated in a second step is the line "−1".

57. The method for processing GNSS signals of claim 56, wherein a step for coefficients is determined by a DFT table size, DFT line spacing, and a coherent sample index.

58. The method for processing GNSS signals of claim 55, further comprising determining a start-up time synchronous to a known event, wherein values for code/carrier phase, code epoch count, and navigation data message phase are calculated by extrapolation of a measurement from another channel.

59. The method for processing GNSS signals of claim 58, wherein by programming the values into a configuration of a channel in advance of the start-up time, such that the channel has time to initialize relevant hardware to a required state, and then programming an exact start time, the channel can pre-initialize an engine and then freeze the engine until an instant that it is configured to start.

60. The method for processing GNSS signals of claim 55, further comprising passing coherent correlation results to the processor for a correlator channel comprising a set of real time correlation results for a number of tap/DFT line combinations to facilitate tracking, wherein in addition to the real time data, a historical data set is presented for one or more taps, wherein the one or more taps are selected to be aligned with a spreading code to be at a strongest correlation phase.

61. An apparatus for processing global navigation satellite systems (GNSS) signals, comprising:

a processing system configured to:
compute a number of correlations against a plurality of signal codes using a plurality of correlation taps;
calculate a discrete Fourier transform (DFT), wherein the processing system performs the DFT calculation by:
calculating a first particular frequency line,
stepping in one direction for a number of lines, and
after a number of lines have been computed, stepping in the opposite direction offset from a second particular line allowing a subset of the DFT lines to be calculated using simple co-efficient calculation; and share an output memory between multiple correlation engines where the memory is dimensioned according to overall system requirements rather than combined data output capability of a complete correlation engine.

62. The apparatus of claim 61, wherein the first particular frequency line calculated is DFT center line and the first particular line calculated in a second step is the line "−1".

63. The apparatus of claim 62, wherein a step for coefficients is determined by a DFT table size, DFT line spacing, and a coherent sample index.

64. The apparatus of claim 61, wherein values for code/carrier phase, code epoch count, and navigation data message phase are calculated by extrapolation of a measurement from another channel and based on a determination of a start-up time synchronous to a known event.

65. The apparatus claim 64, wherein by programming the values into a configuration of a channel in advance of the start-up time, such that the channel has time to initialize relevant hardware to a required state, and then programming an exact start time, the channel can pre-initialize an engine and then freeze the engine until an instant that it is configured to start.

66. The apparatus of claim 61, wherein the processing system is further configured to pass coherent correlation results to the processor for a correlator channel comprising a set of real time correlation results for a number of tap/DFT line combinations to facilitate tracking, wherein in addition to the real time data, a historical data set is presented for one or more taps, wherein the one or more taps are selected to be aligned with a spreading code to be at a strongest correlation phase.

67. A computer program product, comprising:
a non-volatile computer-readable medium comprising code for:
computing a number of correlations against a plurality of signal codes using a plurality of correlation taps;
calculating a discrete Fourier transform (DFT), wherein the DFT calculation is performed by:
calculating a first particular frequency line,
stepping in one direction for a number of lines, and
after a number of lines have been computed, stepping in the opposite direction offset from a second particular line allowing a subset of the DFT lines to be calculated using simple co-efficient calculation; and
sharing an output memory between multiple correlation engines where the memory is dimensioned according to overall system requirements rather than combined data output capability of a complete correlation engine.

68. The computer program product of claim 67, where the first particular frequency line calculated is DFT center line and the first particular line calculated in a second step is the line "−1".

69. The computer program product of claim 68, wherein a step for coefficients is determined by a DFT table size, DFT line spacing, and a coherent sample index.

70. The computer program product of claim 67, wherein values for code/carrier phase, code epoch count, and navigation data message phase are calculated by extrapolation of a measurement from another channel and based on a determination of a start-up time synchronous to a known event.

71. The computer program product claim 70, wherein by programming the values into a configuration of a channel in advance of the start-up time, such that the channel has time to initialize relevant hardware to a required state, and then programming an exact start time, the channel can pre-initialize an engine and then freeze the engine until an instant that it is configured to start.

72. The computer program product of claim 67, wherein the non-volatile storage medium further comprises code for passing coherent correlation results to the processor for a correlator channel comprising a set of real time correlation results for a number of tap/DFT line combinations to facilitate tracking, where in addition to the real time data, a historical data set is presented for one or more taps, where the one or more taps are selected to be aligned with a spreading code to be at a strongest correlation phase.

\* \* \* \* \*